(12) United States Patent
Badr

(10) Patent No.: US 10,736,305 B2
(45) Date of Patent: Aug. 11, 2020

(54) VERSATILE CANINE HARNESS PACK

(71) Applicant: Omar-Samir M. Badr, Pooler, GA (US)

(72) Inventor: Omar-Samir M. Badr, Pooler, GA (US)

( * ) Notice: Subject to any disclaimer, the term of this patent is extended or adjusted under 35 U.S.C. 154(b) by 222 days.

(21) Appl. No.: 16/045,967

(22) Filed: Jul. 26, 2018

(65) Prior Publication Data

US 2020/0029533 A1 Jan. 30, 2020

(51) Int. Cl.
*A01K 27/00* (2006.01)

(52) U.S. Cl.
CPC .......... *A01K 27/008* (2013.01); *A01K 27/002* (2013.01)

(58) Field of Classification Search
CPC .. A01K 27/002; A01K 27/008; A01K 13/006; A01K 27/006; A01K 27/003; A01K 1/0263
USPC ....... 119/856, 858, 792, 850, 907; D30/152, D30/145, 144, 134; 54/37.1, 44.1
See application file for complete search history.

(56) References Cited

U.S. PATENT DOCUMENTS

| | | | | |
|---|---|---|---|---|
| 5,632,235 A | * | 5/1997 | Larsen | A01K 27/002 119/856 |
| 5,887,772 A | * | 3/1999 | Dooley | A01K 1/0263 119/858 |
| 6,443,101 B1 | * | 9/2002 | Fazio | A01K 27/002 119/792 |
| 6,571,745 B2 | * | 6/2003 | Kerrigan | A01K 13/006 119/792 |
| 7,370,608 B1 | * | 5/2008 | Friedman | A01K 13/006 119/850 |
| D606,712 S | * | 12/2009 | Speed | D30/145 |
| 7,918,192 B1 | * | 4/2011 | Digh | A01K 13/006 119/850 |
| D653,411 S | * | 1/2012 | Elliott | D30/144 |
| D664,310 S | * | 7/2012 | Ito | A01K 27/002 D30/144 |
| D670,456 S | * | 11/2012 | Gardner | D30/134 |
| D681,287 S | * | 4/2013 | Collignon | D30/144 |
| D682,486 S | * | 5/2013 | Sebo | A61D 9/00 D30/152 |
| D682,487 S | * | 5/2013 | Tacker-Betancourt | D30/144 |
| 9,949,460 B2 | * | 4/2018 | Austin | A01K 27/008 |
| D833,089 S | * | 11/2018 | Stanek | D30/152 |

(Continued)

*Primary Examiner* — Yvonne R Abbott-Lewis
(74) *Attorney, Agent, or Firm* — John G. Posa

(57) ABSTRACT

A versatile canine harness pack includes a carrier configured to receive one of several usage-related inserts. The carrier has a midsection adapted to cover the back of the animal, and two side portions adapted to cover the shoulders of the animal. The side portions have forward curved edges that extend forwardly beyond the forward, concave edge of the midsection, enabling the side portions to rest over the shoulders of the animal for enhanced conformity with the animal's anatomy. The carrier has a back edge with a zipper facilitating access to the interior of the compartment. One or more flexible insert panels are configured to be received in the compartment. Each insert may further feature loops and/or hook-and-loop fasteners to hold articles for a particular purpose. Inserts may be configured to hold articles on both sides. In the preferred embodiment, the interior of the compartment and the inserts are generally heart-shaped.

9 Claims, 7 Drawing Sheets

(56) References Cited

U.S. PATENT DOCUMENTS

| | | | | |
|---|---|---|---|---|
| 2014/0299073 A1* | 10/2014 | Batista | ............... | A01K 27/008 119/856 |
| 2015/0320011 A1* | 11/2015 | Thorne | ............... | A01K 27/003 119/792 |
| 2018/0027768 A1* | 2/2018 | Spaziano | ............ | A01K 27/002 |

* cited by examiner

VERSATILE CANINE HARNESS PACK

FIELD OF THE INVENTION

This invention relates generally to canine packs and harnesses and, in particular, to an improved harness and pack with improved weight distribution achieved through careful attention to anatomical alignment.

BACKGROUND OF THE INVENTION

To be sure, there are numerous harnesses and backpacks for dogs for applications ranging from hiking to rescue. However, for the most part, these designs do not take canine anatomy into account, and for at least that reason, lead to products that are uncomfortable for the animal, leading to fatigue and, in some cases, pain.

Most canine backpacks are simply that—backpacks for dogs that simply strap onto the back of the animal. One example of many is disclosed in U.S. Pat. No. 6,571,745, which describes a dog pack harness comprised of a base member positioned on the back and the sides of the dog, a plurality of pocket and holding elements for storing various items, a ventral strap assembly means securing the base member to the dog, a dorsal strap assembly device for securing the base member to the collar, and a slidable collar attachment for securing of the collar element to the dorsal strap assembly device. As with most such designs, this dog pack harness has poor weight distribution, virtually ignoring parts of the dog better more naturally equipped to accommodate loads such as the shoulders.

Other designs consider the shoulder area of the animal, but only for attachment and not for weight distribution. One example here is described in Published U.S. Application Serial No. 2010 0212269, entitled "Canine Rescue Harness." This design comprises a body configured for fitting on a canine, one or more receptacles for receiving items, and one or more magnetic fasteners configured for securing the harness to the canine and the magnetic fasteners being configured for disengaging if an external force is applied to the harness. The article is fitted to the dog's chest and torso, and provides openings for the dog's two front legs. According to this reference, "the body 20 is fitted to cover the least amount of area on the dog as needed to secure whatever items are required for the search and rescue operation, so as to minimize overheating of the dog 5 caused by wearing the harness 10. A close fit of the body 20 to the dog 5 may better prevent the harness 10 from getting caught on protruding debris." While these intentions are admirable, the design overall appears to very uncomfortable, with virtually no attention paid to the way in which the article interacts with the neck of the animal. And while the use of magnetic fastening may be adequate for some situations, it is unsuitable for carrying life-saving and/or expensive items.

The need remains, therefore, for a lightweight yet versatile canine pack harness with improved weight distribution, including the ways in which carried articles are distributed on the animal.

SUMMARY OF THE INVENTION

This invention resides in a versatile, canine harness pack that better suits animal anatomy, resulting in less fatigue. The canine harness pack includes a carrier made from upper and lower pieces of flexible material forming a compartment defining a periphery and having an interior configured to receive one of several usage-related inserts. The carrier has a midsection adapted to cover the back of the animal, and two side portions adapted to cover the shoulders of the animal. The midsection has a forward, concave edge adapted to conform with the back of the animal's neck The side portions have forward curved edges that extend forwardly beyond the forward, concave edge of the midsection, enabling the side portions to rest over the shoulders of the animal for enhanced conformity with the animal's anatomy.

A forward strap, connected to the front of the carrier, encircle the neck of the animal, and an adjustable transverse strap, fastened to the upper piece of material forming the carrier, encircles the chest of the animal. The carrier has a back edge with a zipper facilitating access to the interior of the compartment. One or more flexible insert panels are configured to be received in the compartment. Each insert panel has a shape corresponding to the periphery of the carrier, but smaller than the periphery, allowing the zipper to close when received by the compartment. The article may further include an upper D-ring configured for attachment to a leash and a handle extending from the upper piece of material forming the compartment.

The zipper facilitating access to the interior of the compartment is preferably a two-way zipper having two independently operable sliders. The zipper may extend from the rearward edge of the transverse strap on one side of the compartment to the rearward edge of the transverse strap on the opposing side of the compartment. Each insert may have a concave rear edge with a pull-tap to assist with removal from the compartment. Each insert may further feature loops and/or hook-and-loop fasteners to hold articles for a particular purpose. Inserts may be configured to hold articles on both sides. In the preferred embodiment, the interior of the compartment and the inserts are generally heart-shaped.

DETAILED DESCRIPTION OF THE PREFERRED EMBODIMENTS

Figure 1:
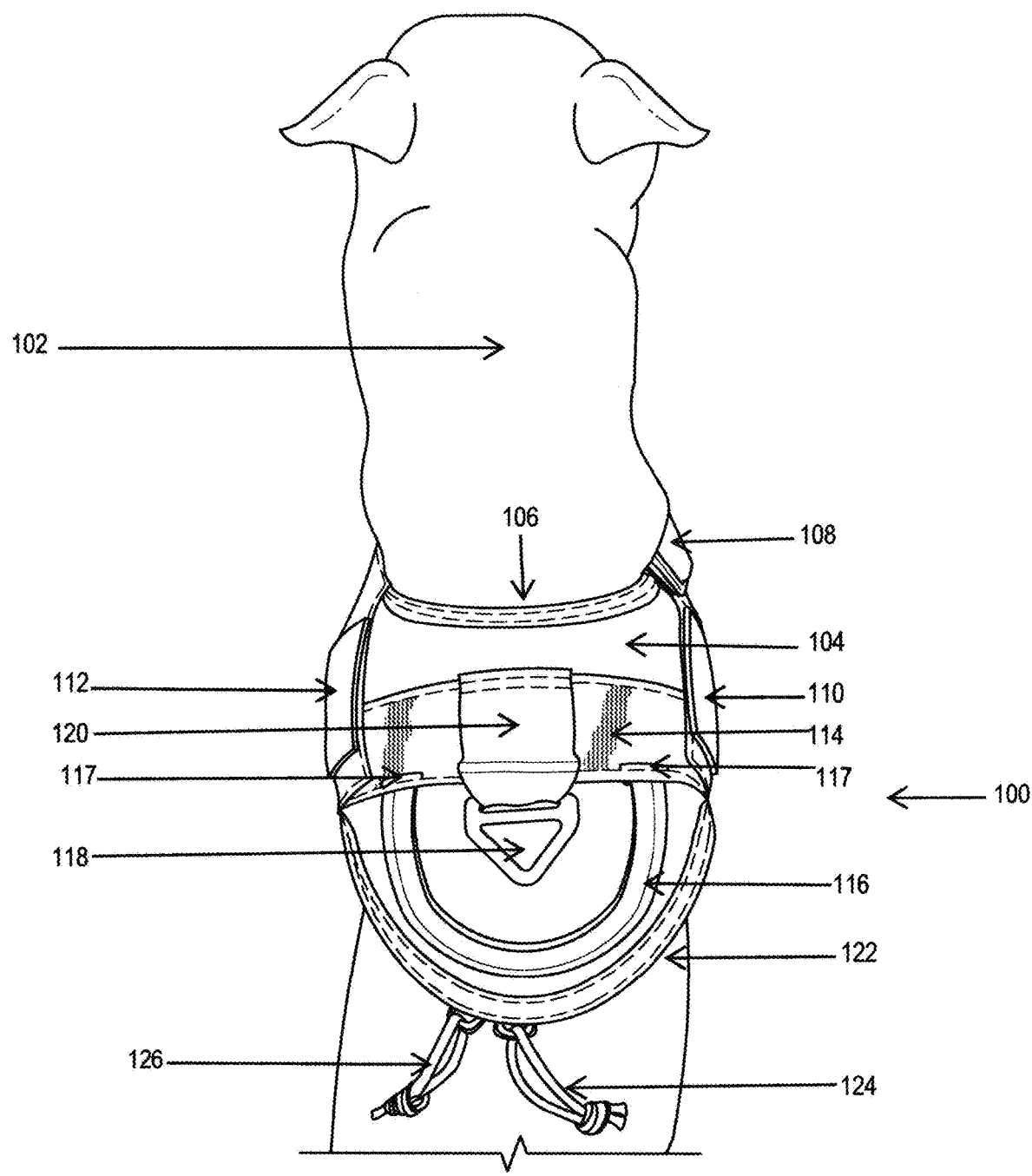
FIG. 1 is a top view of a harness pack constructed in accordance with the invention and mounted on an animal.

Now making reference to the accompanying drawings, FIG. 1 is a top view of a harness pack according to invention depicted generally at 100 and mounted on an animal 102. Certainly the invention is not limited in terms of the animal adapted to receive the harness pack, which would include any type of suitable canine and even other animals, with different sizes being possible through routine design modification.

The harness pack includes a central, somewhat heart-shaped carrier forming a compartment to receive various inserts. The compartment is the same general shape as the inserts, depicted in FIGS. 4-8, but with a somewhat larger periphery enabling the inserts to be comfortably inserted into the compartment, as shown in FIG. 3, with the zipper or other closure mechanism closed as shown in FIG. 2.

Figure 6:
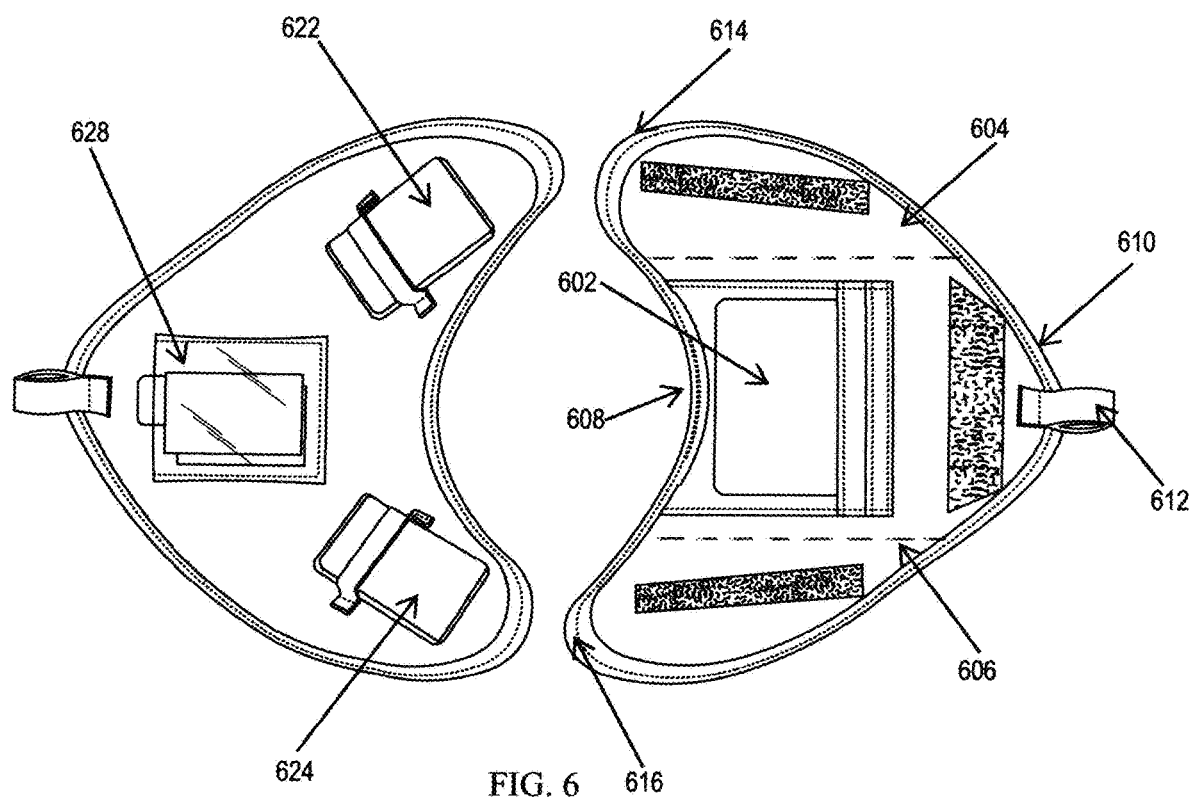
FIG. 6 illustrates an insert configured for treating individuals experiencing anaphylaxis or other emergencies such as drug overdoses.

Making temporary reference to FIG. 6, the compartment, and each insert, includes a midsection 602 that covers the forward portion of the back of the animal, as shown in FIG. 1. The midsection 602 includes a concave forward edge 608 that comfortably fits around the upper neck of the animal, and rear edge that may include a convex curve and attached pull-tab 612. The compartment, and each insert, further include two side lobes 604, 606 that transition from the back edge 610 into two curved, forward edges 614, 616. Note that the edges 614, 616 extend forwardly beyond the edge 608, such that the side lobes 604, 606 drape down onto the sides of the animal and cover the shoulders.

Figure 2:
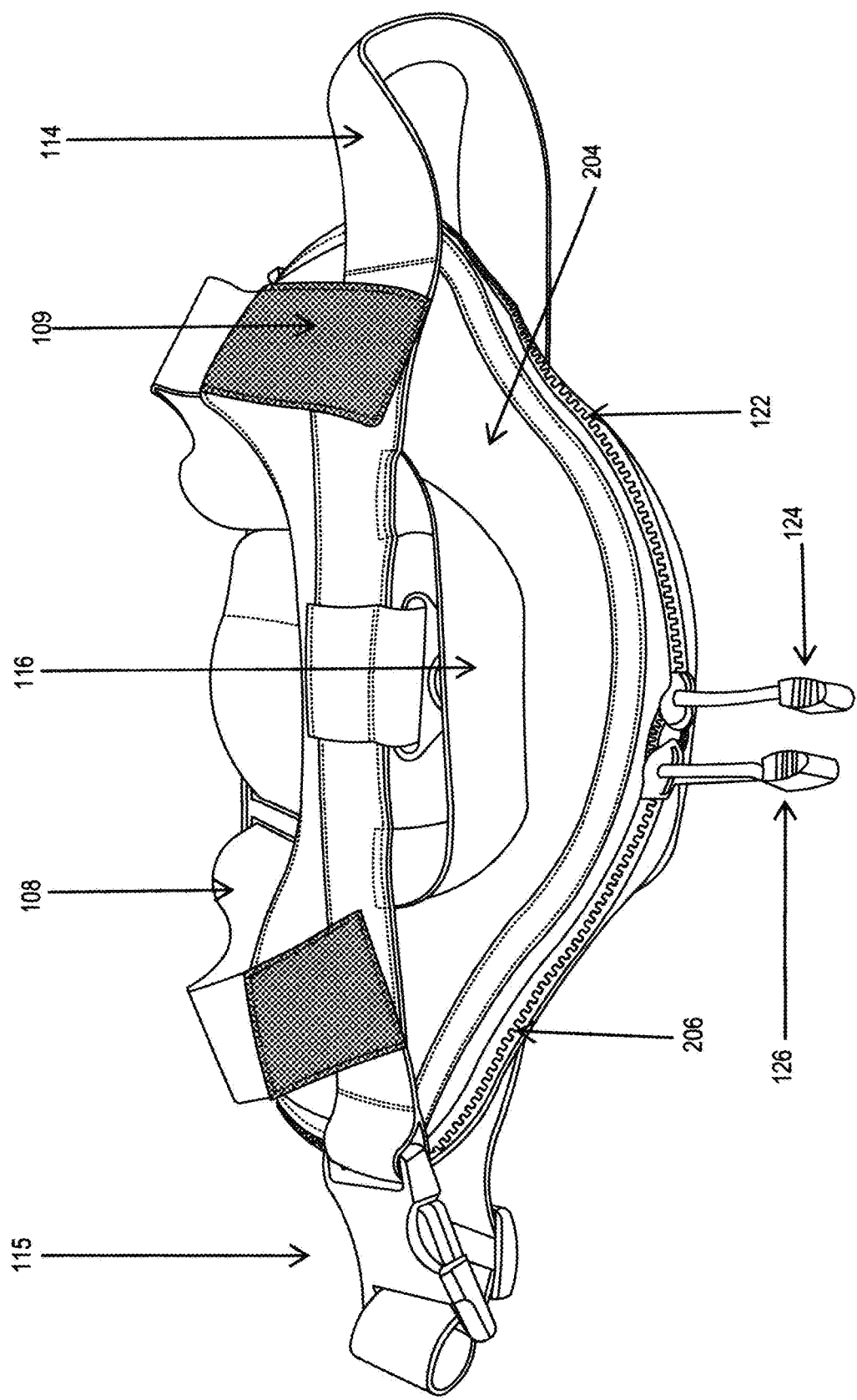
FIG. 2 is a back view of the harness pack with a central compartment in a closed condition.
Figure 3:
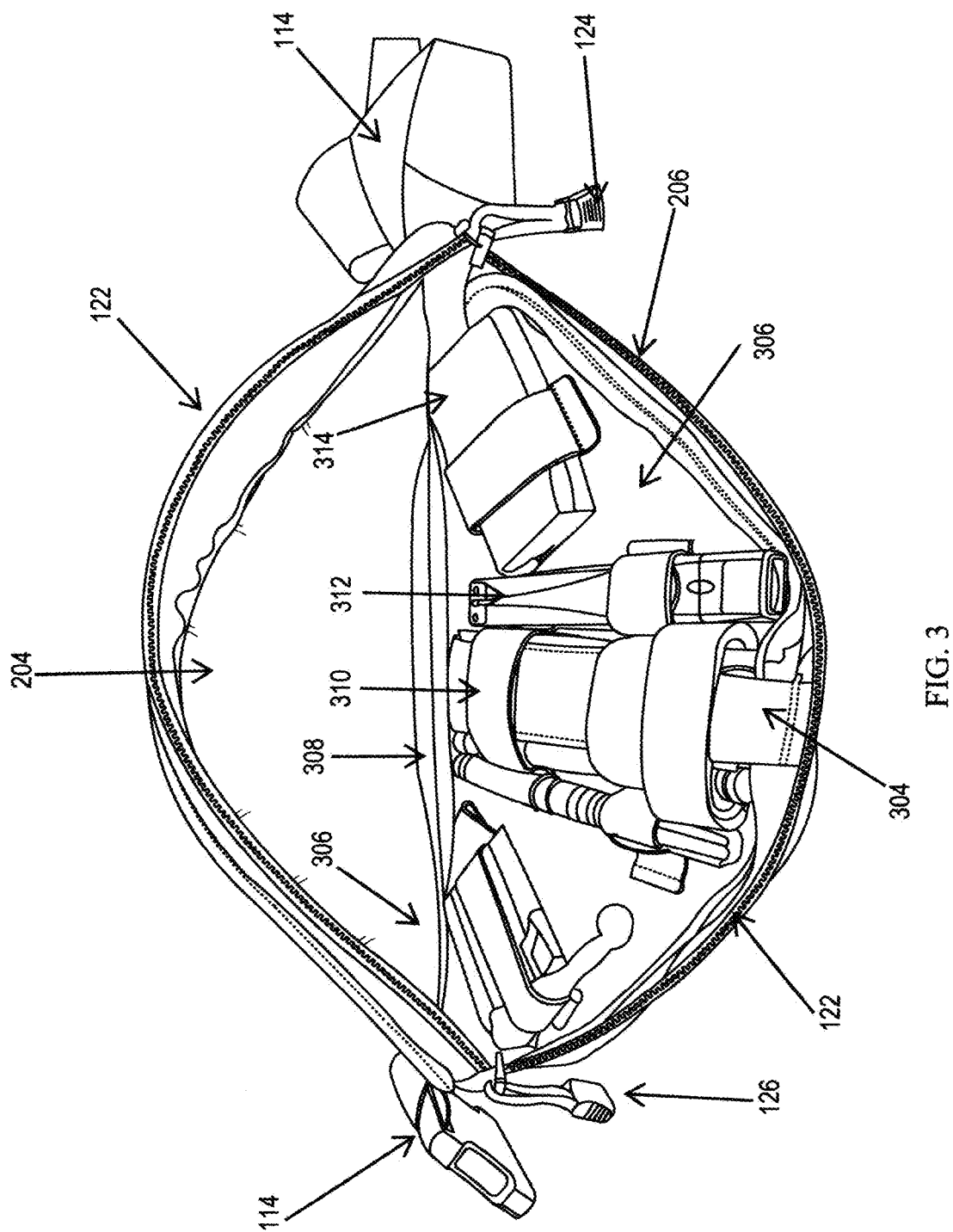
FIG. 3 is a back view of the harness pack with the central compartment in an open condition containing an insert.

As best seen in FIGS. 2, 3, the central carrier is constructed from upper and lower layers 204, 206 of flexible, durable lightweight material such as canvas, though other materials including rip-stop nylon and leather may alternatively be used. With the exception of zipper 122, which extends about half way around each side, the upper and lower layers 204, 206 are peripherally attached, as through sewing.

FIG. 1 shows a portion of the outer surface of the upper layer 204 at 104, though the bottom layer and most of the side portions are not visible in this view. The harness pack further includes a transverse strap 114 that is sewn or otherwise joined to the top surface 104 of the upper layer 204. The strap 114 extends over both sides of the pack, and continues around and under the animal, where the two ends connect through an adjustable fastener 115, providing a snug fit around the animal's chest area. An adjustable front strap 108 is attached to the front of the carrier and configured to go around the neck of the animal. As shown in FIG. 2, the front strap may have opposing ends terminating in a hook-and-loop fastener arrangement.

The straps 108, 114 are preferably made of a strong, durable material such as braided nylon. Strap 114 further includes a sleeve 120 with D-ring 118 for attachment to a leash. A handle 116 may also be provided, with the two ends 117 being fastened under the strap 114 as shown. The forward edge 106 of the carrier includes a concave edge in conformance with the forward edge 608 of the inserts. The zipper 122, preferably a two-way zipper with double slides and optional pull features 124, 126, extends from the strap 114 on both sides, enabling the compartment to be opened wide as shown in FIG. 3 to receive and remove the inserts. Pockets 110, 112 may optionally be provided on the sides of the carrier, and may be transparent or include transparent portions for maps, identification, and the like.

Figure 4:
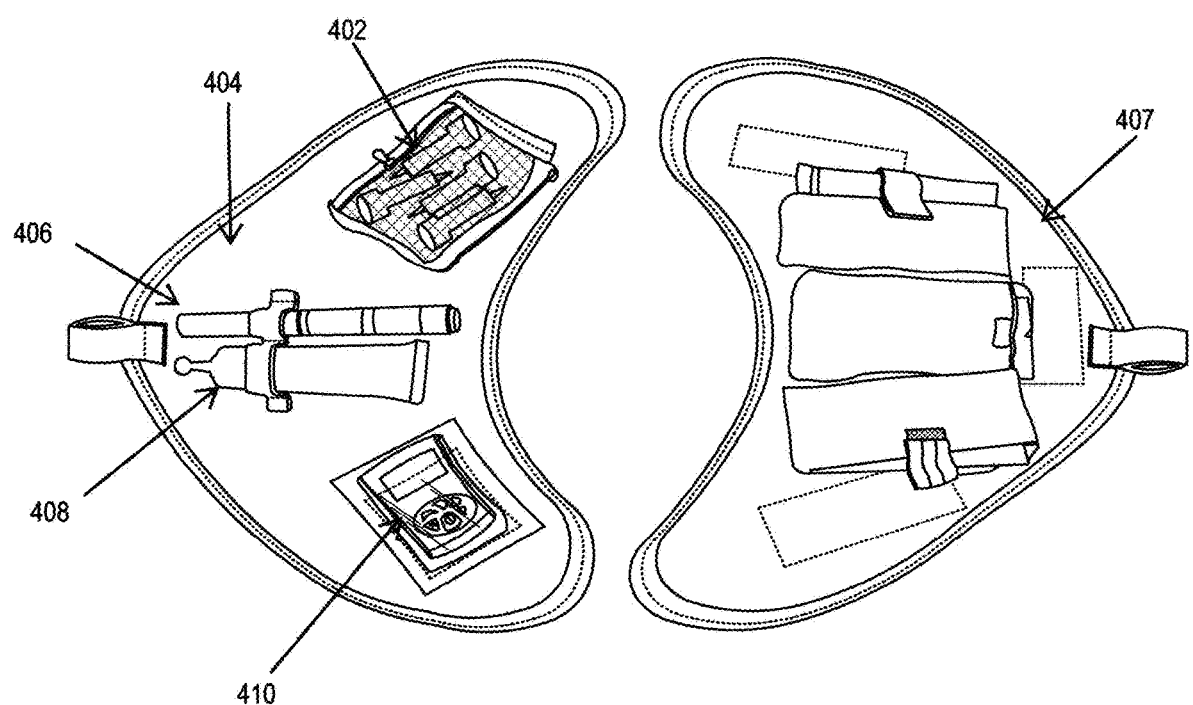
FIG. 4 shows top and bottom view of an insert configured for diabetic emergencies.
Figure 5:
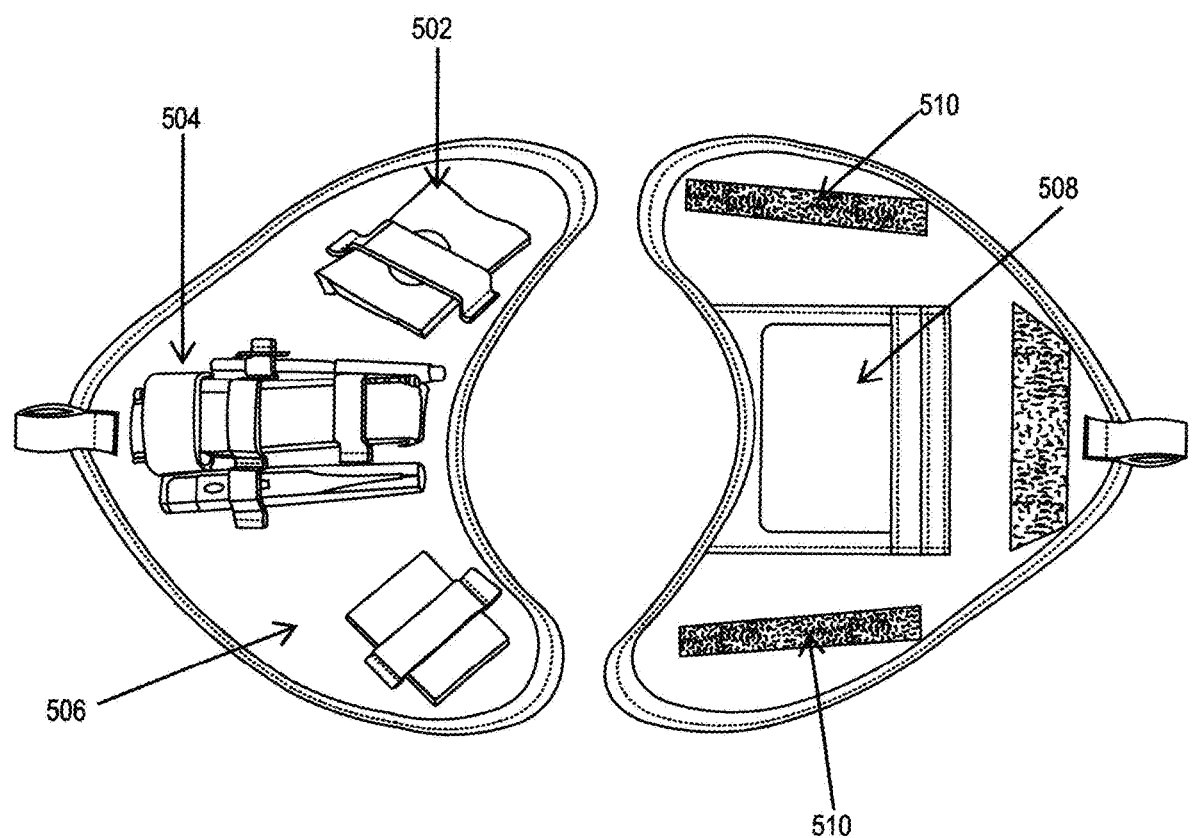
FIG. 5 is an alternative version of the insert of FIG. 3.
Figure 7:
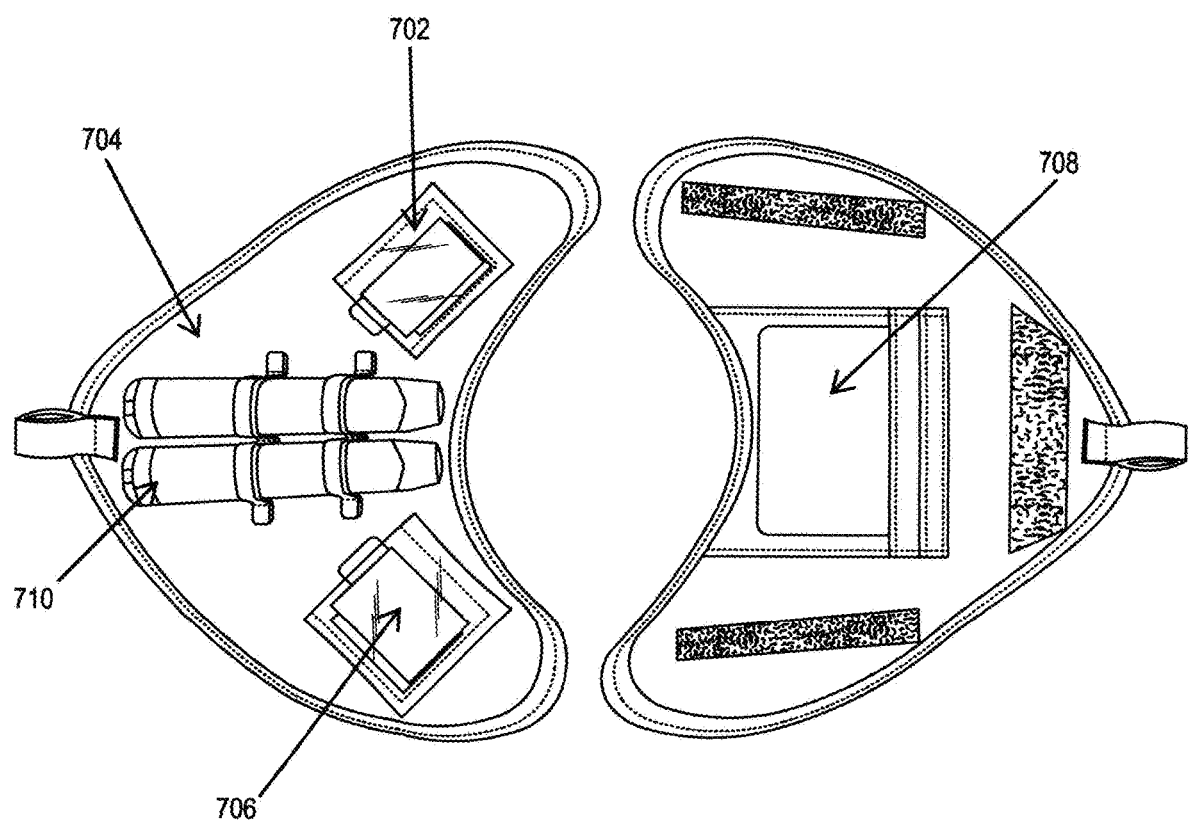
FIG. 7 is a drawings of an alternative insert for treating individuals experiencing anaphylaxis or other emergencies such as drug overdoses.

FIG. 3 illustrates one insert 302 installed in the compartment prior to closure. As with the other inserts disclosed herein, insert 302 preferably includes a pull-tab 304 to assist with removal. Inset 302 may be used for rescue trauma, and may include at least the following items:
- 306: Hemostatic gauze
- 308: North American Rescue: Air Release system (ARS) Chest needle for decompression
- 310: CAT Tourniquet
- 312: Digital Thermometer
- 314: Compact Gauze The insert of FIG. 4 is particularly suited to diabetic emergencies. The top/upper side of insert is depicted at 404, and the down/lower side of insert is shown at 407. The following items are indicated:
- 402: Lancets
- 406: Insulin Pen
- 408: Glucose
- 410: Glucometer Insert 506 of FIG. 5 is a different version of insert of FIG. 3, and may include:
- 502: Compact gauze
- 504: CAT Tourniquet
- 508: See through pocket with Velcro lip
- 510: Hook side of Velcro The inserts of FIGS. 6, 7 may be used to treat individuals experiencing anaphylaxis or other emergencies such as drug overdoses. In FIG. 6, items 602, 628 are see-through pockets, and the pull tab is indicated at 612. This insert may include Kaleo auto injector (Auvi-q/Evzio) 622, 624. In FIG. 7, in addition to EpiPen 710 (or Nalaxone injector), insert 704 includes various pockets and pouches such as 702, 706 and 708.

The invention claimed is:

1. A canine harness pack adapted for an animal having a back with shoulders, a chest and a neck, the harness pack comprising:
    a carrier made from upper and lower pieces of flexible material forming a compartment defining a periphery and having an interior;
    wherein the carrier has a midsection adapted to cover the back of the animal, and two side portions adapted to cover the shoulders of the animal, and wherein the midsection has a forward, concave edge adapted to conform with the back of the animal's neck;
    wherein the side portions have forward curved edges that extend forwardly beyond the forward, concave edge of the midsection;
    a forward strap connected to the front of the carrier and adapted to encircle the neck of the animal;
    an adjustable transverse strap fastened to the upper piece of material forming the carrier, the transverse strap being adapted to encircle the chest of the animal;
    wherein the carrier has a back edge with a zipper facilitating access to the interior of the compartment; and
    one or more flexible insert panels configured to be received in the compartment, each insert panel having a shape corresponding to the periphery of the carrier, but smaller than the periphery, allowing the zipper to close when received by the compartment.

2. The canine harness pack of claim 1, further including an upper D-ring configured for attachment to a leash.

3. The canine harness pack of claim 1, further including a handle extending from the upper piece of material forming the compartment.

4. The canine harness pack of claim 1, wherein zipper facilitating access to the interior of the compartment is a two-way zipper having two independently operable sliders.

5. The canine harness pack of claim 1, wherein zipper extends from the rearward edge of the transverse strap on one side of the compartment to the rearward edge of the transverse strap on the opposing side of the compartment.

6. The canine harness pack of claim 1, wherein the interior of the compartment and the inserts are generally heart-shaped.

7. The canine harness pack of claim 1, wherein each insert has a concave rear edge with a pull-tap.

8. The canine harness pack of claim 1, wherein each insert has loops or hook-and-loop fasteners to hold articles for a particular purpose.

9. The canine harness pack of claim 1, including inserts configured to hold articles on both sides.

* * * * *